INVENTORS:
JERVIS B WEBB &
NORMAN H. PREBLE
BY Joseph Farley
ATTORNEY.

Aug. 8, 1939.  J. B. WEBB ET AL  2,168,852
CATERPILLAR DRIVE FOR CONVEYERS
Filed Dec. 4, 1935  2 Sheets-Sheet 2

INVENTORS.
JERVIS B. WEBB &
NORMAN H. PREBLE
BY Joseph Darley
ATTORNEY.

Patented Aug. 8, 1939

2,168,852

UNITED STATES PATENT OFFICE 2,168,852

CATERPILLAR DRIVE FOR CONVEYERS

Jervis B. Webb, Royal Oak, and Norman H. Preble, Grosse Pointe, Mich., assignors to Jervis B. Webb Company, Detroit, Mich., a corporation of Michigan Application December 4, 1935, Serial No. 52,804

2 Claims. (Cl. 198—203)

This invention relates to driving units for conveyer systems and is intended for use with conveyers of the type now extensively operated in modern manufacturing plants for transporting articles during the process of manufacture. An endless chain system, often of great length, carries the loads and may be driven by one or more driving units. It is possible, but not always practical, to use with these units what might be termed a direct sprocket drive in which the driving sprocket contacts directly with the main conveyer chain. This type of drive is best adapted for use where there is an opportunity to place the drive at a turn in the conveyer's line of travel thereby to secure a larger number of sprocket teeth in contact with the conveyer chain. But it is apparent that when such a drive is placed in a straight section of the conveyer chain, only a small number of sprocket teeth will contact the chain at any one time, a condition which is obviously impractical.

Another type of drive, better adapted for contacting straight sections of the conveyer chain, is termed a caterpillar drive, wherein a secondary endless driving chain having dogs extending from the links of the chain is set up to operate around two closely adjacent sprockets one of which is driven. This driving unit is so placed relative to the main conveyer chain that the dog links engage the links of the conveyer chain and thereby drive the same. Obviously the length of the region of contact may be varied by the spacing of the two sprockets of this caterpillar drive and it is furthermore important with this type of drive to bring the caterpillar and main conveyer chains into and out of driving contact with a smoothness and positive action approaching that of meshing gears. In previous practice, it has been found advantageous in providing smoother action, to set the caterpillar driving unit at a slight angle to the main conveyer chain. It is an object of the present invention however to improve the operation by providing a novel arrangement of guides to act with the conveyer chain and the caterpillar chain thereby to bring the two into driving contact smoothly and positively, hold this contact over a sufficiently long region and then to effect a disengagement without jerking or other uneven motion.

Another phase of the problem is presented by the fact that main conveyer chains are necessarily of relatively large pitch and with a caterpillar chain and a main conveyer chain of the same pitch, the resulting caterpillar chain is of much too large a pitch for efficient operation. For if a sufficient number of sprocket teeth are to be kept in driving contact with the caterpillar chain a large sprocket must be used; excessive torque being placed upon the driving shaft of said sprocket which not only involves the use of very large diameter shafts to avoid breakage thereof, but also increases the load upon the driving unit and the consequent torque required for driving it. If a caterpillar chain of smaller pitch could be used, which would also mesh properly with the large pitch conveyer chain, it would enable a smaller more practical sized driving sprocket to be used while having a sufficient number of sprocket teeth to contact with the links of the caterpillar chain, thus avoiding the increased initial costs of the larger sprockets and shafts as well as other associated parts. It is therefore a further object of the invention to provide a driving unit with a caterpillar chain of a pitch which is smaller than the pitch of the main conveyer chain but with a relation thereto such that the pitch of the main conveyer chain will be an even multiple of the pitch of the caterpillar chain, or twice the pitch of the main conveyer chain will be an even multiple of the pitch of the caterpiller chain, depending upon the type of main conveyer chain used.

The above and other objects of the invention will appear more fully from the following more detailed specification and by reference to the accompanying drawings forming a part hereof and wherein.

Figure 1:
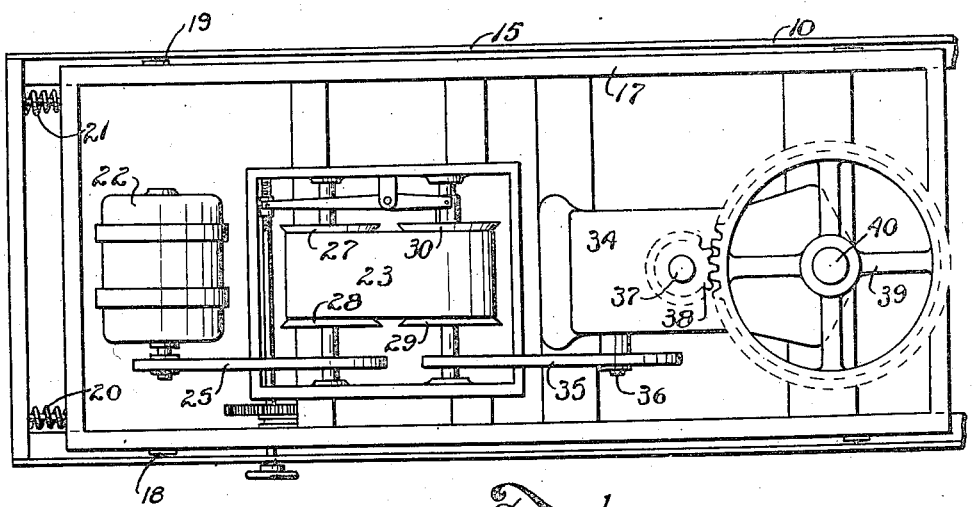
Fig. 1 is a plan view of one of the driving units constructed according to the principles of the present invention.
Figure 2:
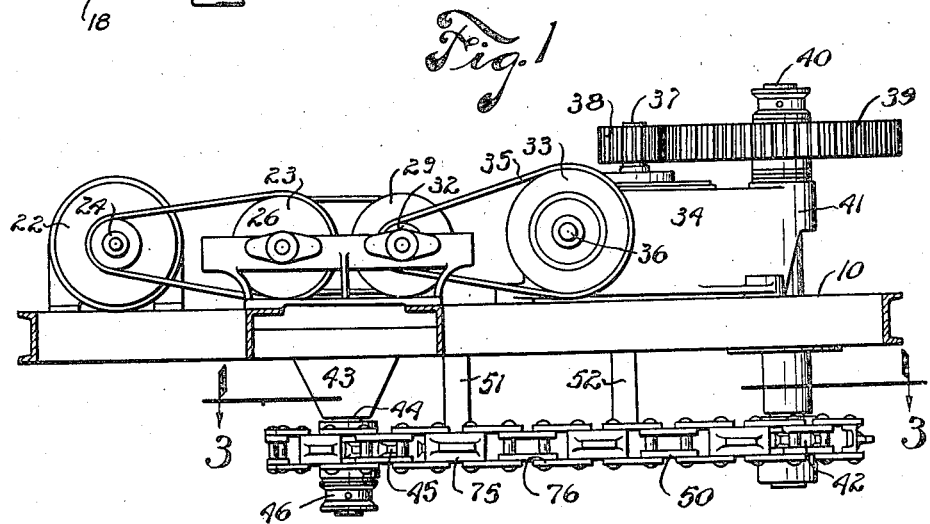
Fig. 2 is a side elevation of structure shown in Fig. 1.

Referring to Figs. 1 and 2, the reference character 10 refers to the driving unit generally which, as to some features thereof, is of the same general type as described more in detail in the specification of a United States patent issued to Jervis B. Webb et al. March 1, 1932, entitled "Equalizing drive for conveyer systems" No. 1,847,152.

This driving unit 10 here used for illustration consists of a main supporting frame 15 which may be supported from the ceiling or any suitable supporting structure. Mounted within the supporting frame 15 is a movable frame 17 with a plurality of bearing units such as anti-friction rollers 18 and 19 therebetween thereby allowing a limited longitudinal movement of the movable frame 17 upon the supporting frame 15, springs 20 and 21 being provided between the frames 15 and 17 normally to urge the frame 17 towards the right in Fig. 1.

Mounted upon the movable frame 17 is a motor 22 which drives a speed changing unit 23 also mounted on movable frame 17 from a pulley 24 through a belt 25 to a pulley 26. The speed changing unit 23 may be of any suitable type such as a well known Reeves drive employing cone shaped pulleys 27, 28, 29, 30, such as described in the specification of my patent mentioned above, wherein it is also explained that the Reeves drive speed changing unit is adjustable by hand or may be so connected with the movable frame 17 as to be changed automatically depending upon the amount of load thrown upon the unit to produce a longitudinal movement of the frame 17 against the springs 20, 21. A pulley, or sprocket, 32 connected to the output shaft of the speed changing unit 23 drives a pulley 33 on gear box 34 through a belt 35. The gear box 34 may contain any suitable gearing so that the rotary motion of the shaft 36 on which the pulley 33 is mounted will be transferred to the vertical shaft 37 on which is mounted a gear 38 which meshes with a large gear 39 secured to a shaft 40 suitably mounted in bearings 41, such shaft 40 projecting downwardly through the frame 17 as shown in Fig. 2 and having secured to its lower end a sprocket wheel 42.

Also on the lower side of the frame 17 as shown in Fig. 2, there is mounted a depending bracket 43 with a projecting shaft 44 which forms a bearing for an idler sprocket 45, free to rotate on the shaft 44 and restrained against movement axially of said shaft between the bracket 43 and a retaining member 46 secured to the shaft 44. As shown in Fig. 2, the sprockets 42 and 45 are aligned and a caterpillar chain 50 is trained around both sprockets 42 and 45, as seen best in Fig. 3, so that when drive is applied by the motor 22 through the mechanism just described, the sprocket 42 will continuously drive the chain 50 in a clockwise direction around sprockets 42 and 45.

Figure 3:
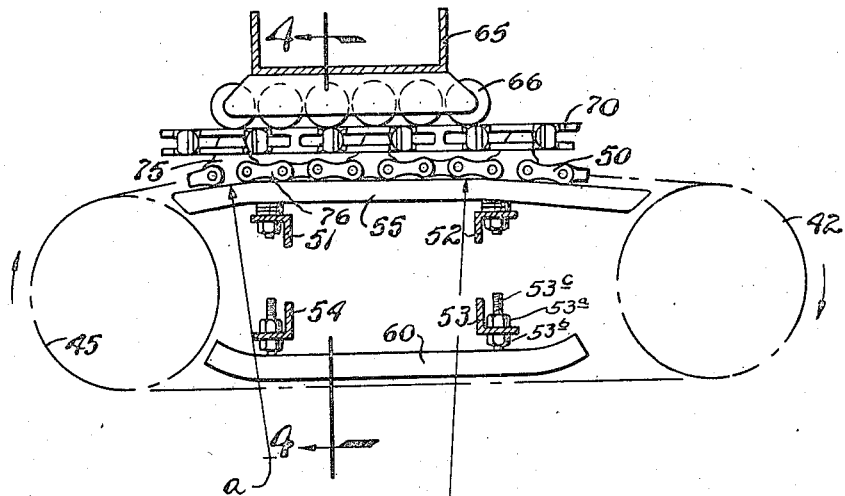
Fig. 3 is a section taken on the line 3—3 of Fig. 2 and shows in plan view the caterpillar drive and conveyer chain in contacting engagement as would be the case in an installation.
Figure 4:
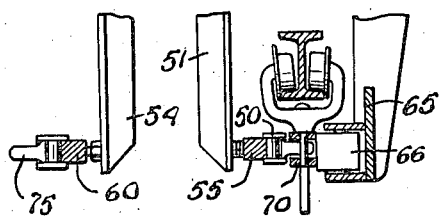
Fig. 4 is a section taken on the line 4—4 of Fig. 3 and shows the guides for the conveyer chain and caterpillar chain.

Also extending downwardly from the movable frame 17 are four supporting structural members 51, 52, 53 and 54. As shown in Fig. 3 the members 51, 52 have secured at their lower ends a guide rail 55 which is of such width, as shown in Fig. 4, to form a backing or reaction support for the rollers 56 in the chain links of the caterpillar chain 50. The guide rail 55 as also shown in Fig. 3 is formed with a radius at each end, the radius at the left hand end in Fig. 3 having its center designated as "a" being smaller than the radius at the right hand end having its center designated as "b". The guide rail 55 is straight between these two radii and the shape thus provided causes the caterpillar chain to follow a path outwardly displaced from the straight line substantially tangent to the pitch diameters of sprockets 42 and 45 which it would naturally follow.

The supporting structural members 53 and 54 likewise support a guide rail 60 on the opposite side of the caterpillar drive which engages with the chain rollers 56 in a plane lying substantially tangent to the pitch diameters of the sprockets 42 and 45. The mounting of the guide rail 60 also provides an adjustment to take up slack in the caterpillar chain 50, since the position of the said guide rail 60 may be adjusted by change in the positions of nuts 53a and 53b on threaded rod 53c, a similar unit being provided at the support 54.

In order to insure continuous meshing engagement between the driving caterpillar chain and the conveyer chain there is also provided, as shown in Fig. 3, a supporting bracket 65 which may be secured to any stationary support and which bracket is provided with a plurality of rollers 66 mounted for rotation and so spaced from the guide rail 55 that there is a passage defined with just enough room for the main conveyer chain 70 when meshed with the caterpillar drive chain 50 to pass between the rollers 66 and the guide rail 55.

Figure 5:
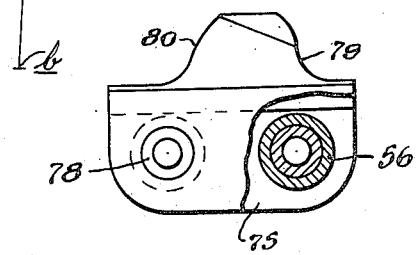
Fig. 5 is a view partly in section showing the details of one of the dog links of the caterpillar chain.

The caterpillar chain 50 is made up of so-called dog links 75 which in the particular example selected for illustration has connected between them three intermediate plain links 76. As shown in Fig. 5 there is provided a roller 56 between the flanges of each of the links of the caterpillar chain, said roller encircling the pins 78 which hold the links together. As before mentioned and shown best in Fig. 4, the flanges of each of the links project beyond the rollers 56 and extend beyond each edge of the guide rail 55 thereby not only allowing the rollers 56 to contact the vertical face of the guide rail and afford a rolling contact therewith but said flanges also serve to maintain the chain rollers in proper alignment with said rail.

In order to further improve the engagement of the dog links of the caterpillar chain with the main conveyer chain, the tooth contour at forward face 79 and rearward face 80 of the dog links 75 are designed with a consideration of the path defined by the guide rail 55 relative to the straight path of the main conveyer chain and a relation therefore exists between the radii $a$ and $b$ at the ends of guide rail 55 and the tooth contours at 79 and 80.

Rollers 66, as shown best in Fig. 4, are approximately the same width as the main conveyer chain 70 and provide rolling contact when said chain moves against the rollers in passing between the guide rail 55 and the roller bracket.

The pitch of the caterpillar chain 50 is so selected that it is smaller than the pitch of the main conveyer chain 70, the relation being some even multiple of the pitch of the caterpillar chain 50. That is, as shown in Fig. 3, the pitch of the chain 70 is twice the pitch of the chain 50 and three intermediate plain links 76 are provided between each pair of dog links 75. In this way, the dog links engage every other link of the conveyer chain 70 and the caterpillar chain 50 is broken up into a relatively greater number of links than would be the case if the pitches of both chains were the same.

With these conditions, it is possible to reduce the size of the sprockets 42 and 45 since the same number of teeth in driving contact can be had in a much smaller sprocket than would be available in a relatively larger sprocket using a chain of the larger pitch.

In operation, the bracket 65 is so placed as to rest against the conveyer chain 70 in its line of normal travel and the driving unit 10 is so located that the face of the guide rail 55 is spaced from the roller 66 and bracket 65 a distance just sufficient to allow space for caterpillar chain 50 and main conveyer chain 70 when the dog links of chain 50 are in driving mesh with the links of conveyer chain 70. It is to be noted that as the caterpillar chain 50 moves clockwise as shown in Fig. 3 around sprockets 42 and 45 and as a dog link 75 comes in contact with the left hand end of the guide rail 55, as shown in Fig. 3, the radius on said guide rail causes the said link 75 to move in a path such that it gradually approaches contact with the conveyer chain 70. The radius shown with center $a$ on the guide rail 55 is so selected that the link 75 is in effect turned relative to the chain 70 so that when the forward face 79 contacts the chain 70, there is somewhat of a rolling rather than a purely sliding contact thereby making for a smoother engagement. It is noted that the drawing in Fig. 3 shows three dog links in engagement with chain 70 and it is apparent that this number is controlled by the distance selected for the location of the sprockets 42 and 45. Continuing with the tracing of one link 75, it next travels along the straight section of the guide rail 55 and as it approaches the radius at the right hand end of the guide rail shown at $b$ in Fig. 3, the path is such that as the link traverses this radius it turns upon the face in contact with the conveyer chain 70 and gradually disengages therefrom with a partial rolling effect until it is entirely disengaged and passes around the sprocket 42. It is apparent that the conveyer chain backed by the rollers 66 and the caterpillar links positively guided for engaging and disengaging with the chain will greatly improve the drive over one in which a straight caterpillar chain is used with no guide or other backing for the conveyer chain, or when a flat guide without rollers is used.

The particular constructional assemblies herein disclosed have been selected merely as illustrative of the principles of the invention and not as limiting the invention to the specific details selected for illustration. It will, therefore, be understood that many changes, variations and modifications may be resorted to without departing from such principles, for example, the assembly shown in Fig. 3 is not limited to a floating drive such as shown in Figs. 1 and 2.

The main conveyer chain 70, as shown, is the so-called Wilmot type chain, which is disclosed in Wilmot United States Patent No. 870,704. It is of course understood that other types of chain may be used.

It is also noted that the showing in Fig. 3 may be varied as to the type of chain and the pitch of such chain, always considering that the relation in pitch between the caterpillar chain and the main driving chain must be such as to allow meshing for driving engagement while preferably keeping the caterpillar chain pitch smaller than the pitch of the main conveyer chain. Furthermore, if alternate main conveyer chain links are to be engaged as in the so-called Wilmot chain shown, then twice the pitch of the main conveyer chain must be an even multiple of the pitch of the caterpillar chain so that dog links will always come in proper location. When different pitch combinations are used there may of course be a different number of plain links between dog links of the caterpillar chain but if the above mentioned relation is maintained meshing will always be possible. It is also apparent that a type of chain might be used such that each link of the conveyer chain could be engaged by a dog link and then the relation would be such that the pitch of the conveyer chain be an even multiple of the pitch of the caterpillar chain. It is also possible to select a combination such as actually shown in Fig. 3 wherein the pitch of the main conveyer chain is an even multiple of the pitch of the caterpillar chain but with dog links meshing with every other link of the main conveyer chain. In this instance, however, the statement that twice the pitch of the conveyer chain is an even multiple of the pitch of the caterpillar chain is also true. A general statement covering the above, as well as other possible combinations, would be that the pitch distance between links of the conveyor chain which are engaged by dog links must be some even multiple of the pitch of the caterpillar chain while maintaining the pitch of the main conveyer chain greater than the pitch of the caterpillar chain.

We claim:

1. In a driving unit for a main conveyer chain of the type wherein an endless caterpillar chain having projecting toothed driving links is carried around two adjacent sprockets so positioned as to effect a driving contact between said endless caterpillar chain and said main conveyer chain, characterized by an arcuate shaped guide rail to define the path of said caterpillar chain in a region adjacent said main conveyer chain to effect approach and recession to and from driving contact with said chain, and guide means comprising a plurality of rollers positioned on one side of said main conveyer chain and so spaced from said guide rail as to retain said caterpillar chain and said main conveyer chain between said guide rail and said roller guide means thereby to require a definite relative path of movement for said main driving chain and said caterpillar driving chain.

2. In a driving unit for a main conveyer chain of the type wherein a caterpillar driving chain is operated around two adjacent sprockets, said chain being provided with toothed projections of substantially involute contour for driving contact with said main conveyer chain, characterized by the fact that the pitch of said caterpillar chain is less than but an even multiple of the pitch of said main conveyer chain, a guide rail defining a definite path for said caterpillar chain guide means comprising a plurality of rollers spaced from said guide rail for defining the path of said main conveyer chain and retaining said caterpillar chain and said main conveyer chain between said guide rail and said roller guide means, the said guide rail and said roller guide means being of such shape and position relative to the shape and position of said toothed projections of involute contour on said caterpillar chain whereby a smooth rolling driving engagement and disengagement of said toothed projections of said caterpillar chain with said main conveyer chain is effected.

JERVIS B. WEBB.
NORMAN H. PREBLE.